(12) United States Patent
Liu et al.

(10) Patent No.: US 11,520,191 B2
(45) Date of Patent: Dec. 6, 2022

(54) SEGMENTED CONTROL OF A DISPLAY DEVICE'S PRIVACY CELL

(71) Applicant: Dell Products L.P., Round Rock, TX (US)

(72) Inventors: Yu-Chen Liu, Hsinchu (TW); Hong-Ji Huang, Xinyi Dist. (TW); Joshua Lin, Chungli (TW)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 17/164,182

(22) Filed: Feb. 1, 2021

(65) Prior Publication Data

US 2022/0244602 A1   Aug. 4, 2022

(51) Int. Cl.
  *G02F 1/1343*     (2006.01)
  *G02F 1/133*      (2006.01)
  *G02F 1/13*       (2006.01)

(52) U.S. Cl.
  CPC ...... *G02F 1/134327* (2013.01); *G02F 1/1323* (2013.01); *G02F 1/13318* (2013.01); *G02F 1/134336* (2013.01)

(58) Field of Classification Search
  CPC .................. G02F 1/1323; G02F 1/134327
  See application file for complete search history.

(56) References Cited

U.S. PATENT DOCUMENTS

| | | | |
|---|---|---|---|
| 2005/0243265 A1* | 11/2005 | Winlow | G02F 1/1323 349/178 |
| 2017/0219859 A1* | 8/2017 | Christophy | G02F 1/1336 |
| 2018/0081208 A1* | 3/2018 | Zhao | G02F 1/134309 |
| 2018/0231792 A1* | 8/2018 | Wang | G02B 27/4205 |

FOREIGN PATENT DOCUMENTS

CN         106125361 A  * 11/2016  ........... G02F 1/1323

* cited by examiner

*Primary Examiner* — Alexander P Gross
(74) *Attorney, Agent, or Firm* — Kirton McConkie; Brian Tucker

(57) ABSTRACT

Privacy cells can be configured to enable segmented control. A privacy cell can include a segmented array of electrodes that allow segments of liquid crystal to be independently controlled. By independently applying a voltage to each electrode, the liquid crystal within each segment can be independently oriented at a desired angle for a particular mode of operation.

18 Claims, 8 Drawing Sheets

SEGMENTED CONTROL OF A DISPLAY DEVICE'S PRIVACY CELL

CROSS-REFERENCE TO RELATED APPLICATIONS

N/A

BACKGROUND

Various techniques exist for providing privacy on a display device. For example, a privacy screen (or filter) can be placed overtop the display device to prevent viewing of displayed content unless the viewer is positioned directly in front of the display device. Such privacy screens are typically in the form of a thin sheet of plastic that are structured to block light emitted from the display device unless it is substantially perpendicular to the privacy screen. For example, some privacy screens provide a 60 degree viewing angle meaning that content on the display device cannot be seen if the viewer is viewing the screen at an angle greater than 30 degrees.

More recently, active privacy screens, or privacy cells, have been developed. A privacy cell generally functions in the same manner as a privacy screen but can be turned on and off. For example, a privacy cell can be formed of liquid crystal that can be activated or deactivated based on an applied voltage. FIG. 1 illustrates a laptop 100 that has a display device 200 that includes a privacy cell 203. As shown, privacy cell 203 can be positioned between a backlight unit 204 and a display cell 202 within the front frame 201 and rear frame 205 of display device 200. Display cell 202 can represent the assembly that creates the display which may commonly be an LCD assembly in current display devices. Backlight unit 204 can represent the assembly that provides light to display cell 202 and may include fluorescent lamps (e.g., in a typical LCD monitor), LEDs (e.g., in a typical LED monitor) or other light sources.

FIG. 2 provides an example of how privacy cell 202 can be turned on and off to selectively provide privacy. Privacy cell 202 can be in the form of a sheet of liquid crystal 202a that substantially matches the shape and size of display cell 203. A front electrode 202b can be positioned overtop the front side of liquid crystal 202a and a rear electrode 202c can be positioned overtop the rear side of liquid crystal 202c. On the left side of FIG. 2, it is assumed that privacy cell 202 is turned off which may be the case when no voltage is applied between front electrode 202b and rear electrode 202c. When off, privacy cell 202 will not block light regardless of its angle of incidence. Therefore, light emitted from backlight unit 201 at angles that substantially deviate from the perpendicular will pass through privacy cell 202 and display cell 203 thereby allowing content displayed by display device 200 to be visible at virtually any angle. In contrast, on the right side of FIG. 2, it is assumed that privacy cell 202 is turned on which may be the case when a voltage is applied between front electrode 202b and rear electrode 202c. When on, privacy cell 202, or more particularly, liquid crystal 202a, will block light unless it is traveling substantially perpendicular to privacy cell 202. For example, if privacy cell 202 creates a viewing angle of 60 degrees, it will substantially block any light emitted from backlight unit 201 that has an angle of incidence greater than 30 degrees.

Laptop 100 may typically include a key or key combination that allows the user to turn privacy cell 202 on or off. In particular, when the user wants privacy, he or she can press the key or key combination to cause a voltage to be applied between front and rear electrodes 202b, 202c. Then, when the user no longer wants privacy, he or she can press the key or key combination to cause the voltage to no longer be applied between front and rear electrodes 202b, 202c.

BRIEF SUMMARY

The present invention encompasses privacy cells that enable segmented control, display devices containing such privacy cells and systems, methods and computer program products for enabling segmented control of such privacy cells. A privacy cell can include a segmented array of electrodes that allow segments of liquid crystal to be independently controlled. By independently applying a voltage to each electrode, the liquid crystal within each segment can be independently oriented at a desired angle for a particular mode of operation.

In some embodiments, the present invention is implemented as a privacy cell for a display device. The privacy cell may include a liquid crystal portion having a first side and a second side, a segmented array of electrodes arranged on the first side to thereby divide the liquid crystal into a plurality of segments, one or more electrodes arranged on the second side to which the segmented array of electrodes are connected and circuitry for applying a distinct voltage to each electrode in the segmented array of electrodes to thereby independently control the liquid crystal within each of the plurality of segments.

In some embodiments, the present invention is implemented as a display device having a backlight unit, a display cell and a privacy cell positioned between the backlight unit and the display cell. The privacy cell includes a liquid crystal portion having a first side and a second side, a segmented array of electrodes arranged on the first side to thereby divide the liquid crystal into a plurality of segments, one or more electrodes arranged on the second side to which the segmented array of electrodes are connected and circuitry for independently applying a voltage to each electrode in the segmented array of electrodes to thereby independently control the liquid crystal within each of the plurality of segments.

In some embodiments, the present invention is implemented as a method for controlling a segmented privacy cell of a display device. Input requesting that privacy mode be implemented on the display device can be detected. A voltage for each of a plurality of segments of the segmented privacy cell can be obtained. The voltages can then be applied to the plurality of segments of the segmented privacy cell to thereby cause each of the plurality of segments to be independently controlled.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention encompass privacy cells that enable segmented control, display devices containing such privacy cells and systems, methods and computer program products for enabling segmented control of such privacy cells. By configuring a privacy cell to enable segmented control, improved privacy and sharing modes can be implemented.

Figure 3:
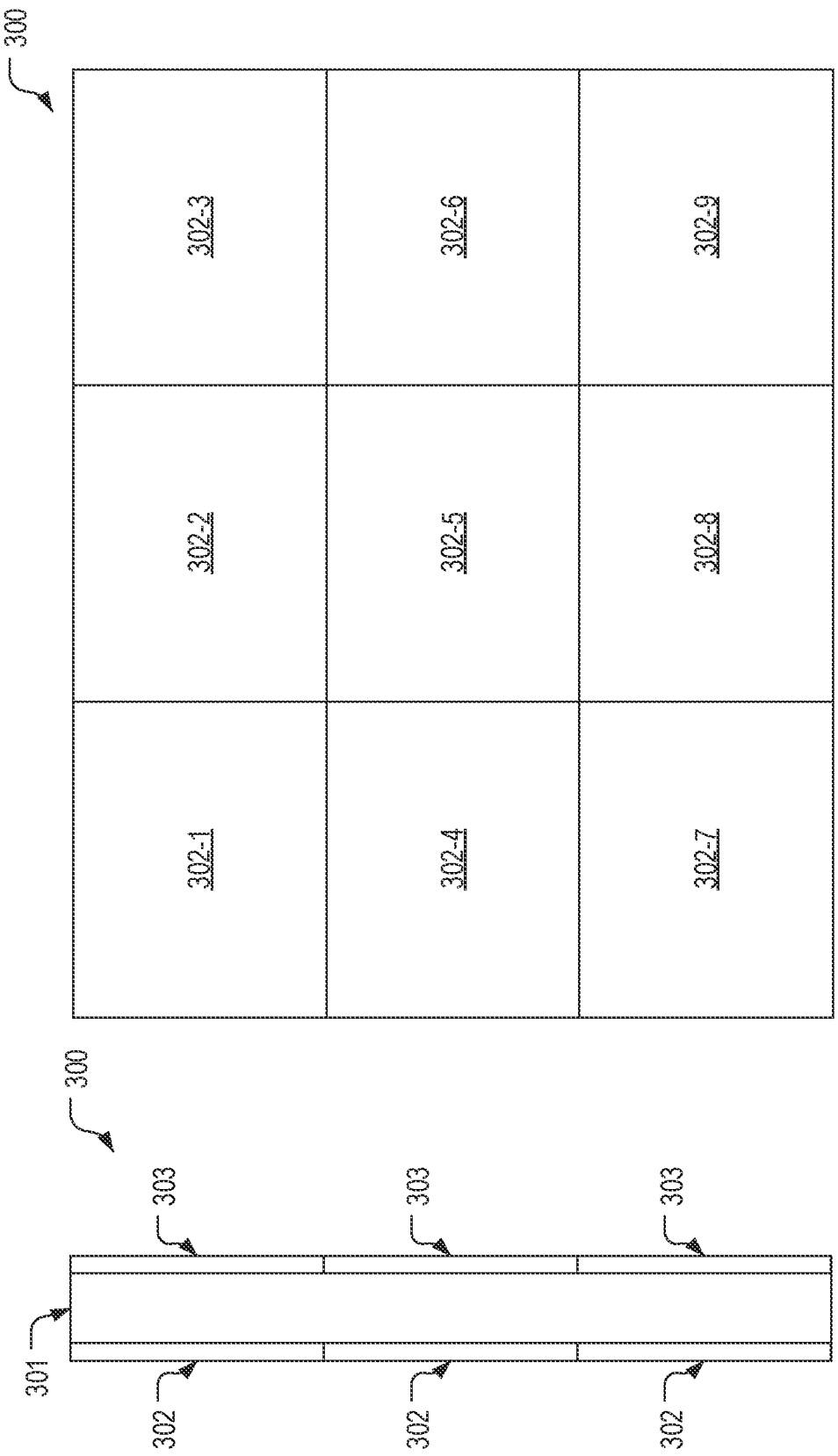
FIGS. 3A and 3B provide side and elevation views respectively of a privacy cell that is configured in accordance with one or more embodiments of the present invention.

FIGS. 3A and 3B are side and elevation views respectively of a privacy cell 300 that is configured in accordance with one or more embodiments of the present invention. Privacy cell 300 could be used in place of privacy cell 202 in display device 200 or in any other suitable display device. Privacy cell 300 includes a sheet of liquid crystal 301, a segmented array of electrodes 302 on one side of liquid crystal 301 and a corresponding segmented array of electrodes 303. In the depicted example, electrodes 302, 303 are segmented into a 3×3 array (302-1 through 302-9 and 303-1 through 303-9) but other arrangements could be employed (e.g., 3×1, 2×2, 5×5, m×n or n×n where m and n are any positive integer). Although a segmented array of electrodes is shown on both sides of liquid crystal 301, in some embodiments, a single electrode could be employed on one side with an array of electrodes on the other side. Also, each segment could, but need not be, the same size and shape. Accordingly, a privacy cell configured in accordance with embodiments of the present invention can include more than one segment where each segment can be independently controlled.

Figure 4:
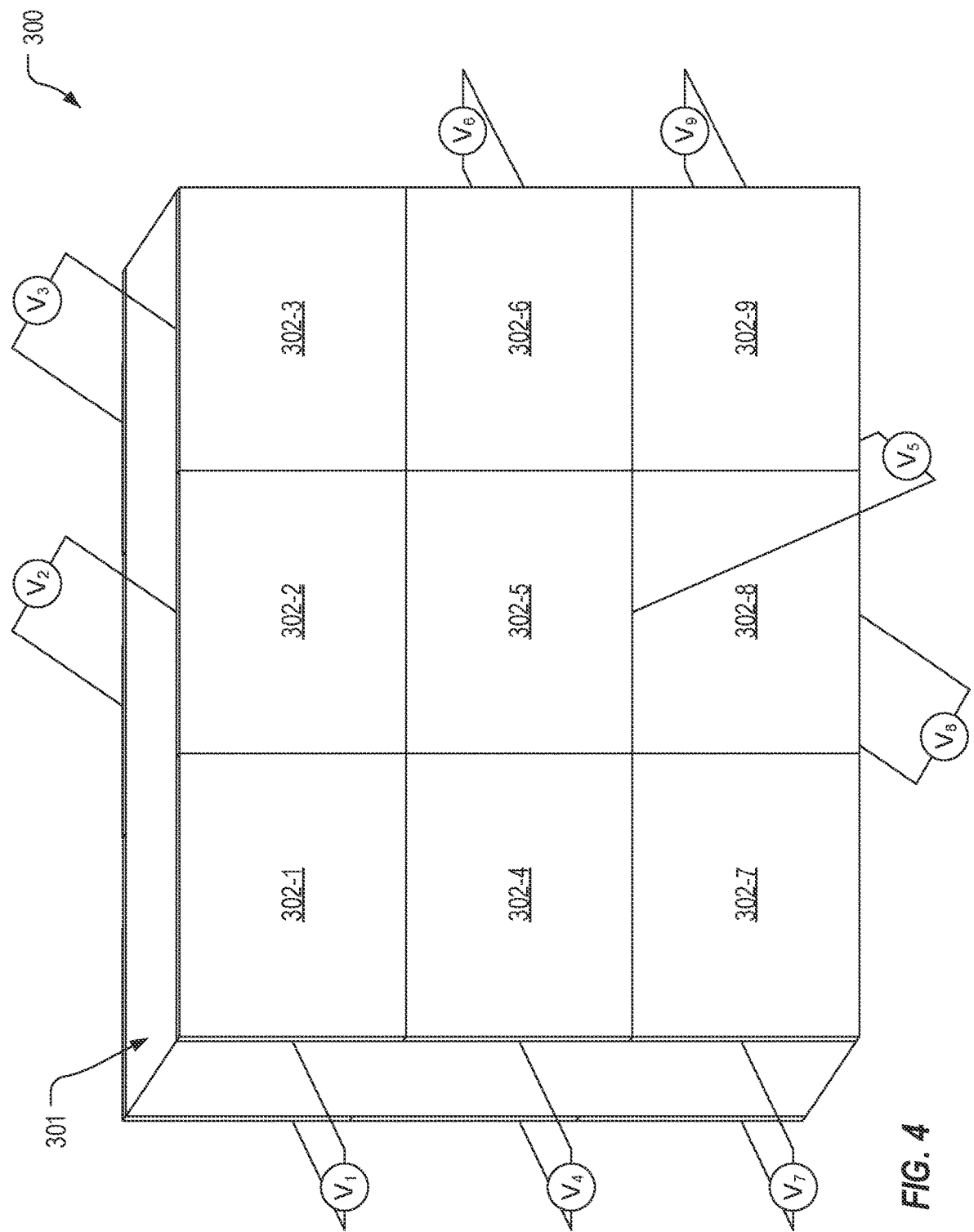
FIG. 4 provides an example of how segmented control can be implemented with the privacy cell of FIGS. 3A and 3B.

FIG. 4 provides an example of how the nine segments of privacy cell 300 can be independently controlled. As shown, electrodes 302-1 through 302-9 are configured to allow a different voltage $V_1$ through $V_9$ to be applied to thereby create the different voltage between the respective electrode 302 and the corresponding electrode 303. These different voltages will cause the portion of liquid crystal 301 between the respective electrodes to behave differently. For example, when a voltage is not applied to liquid crystal, the liquid crystal molecules will tend to be randomly oriented and will therefore scatter light. In contrast, when a voltage is applied to liquid crystal, the liquid crystal molecules will tend to align with the voltage. By independently controlling the voltage applied to each segment, the liquid crystal molecules within each segment can be independently oriented in a distinct direction. In accordance with some embodiments of the present invention, this distinct direction can be towards the location where the user would typically be.

Figure 5A:
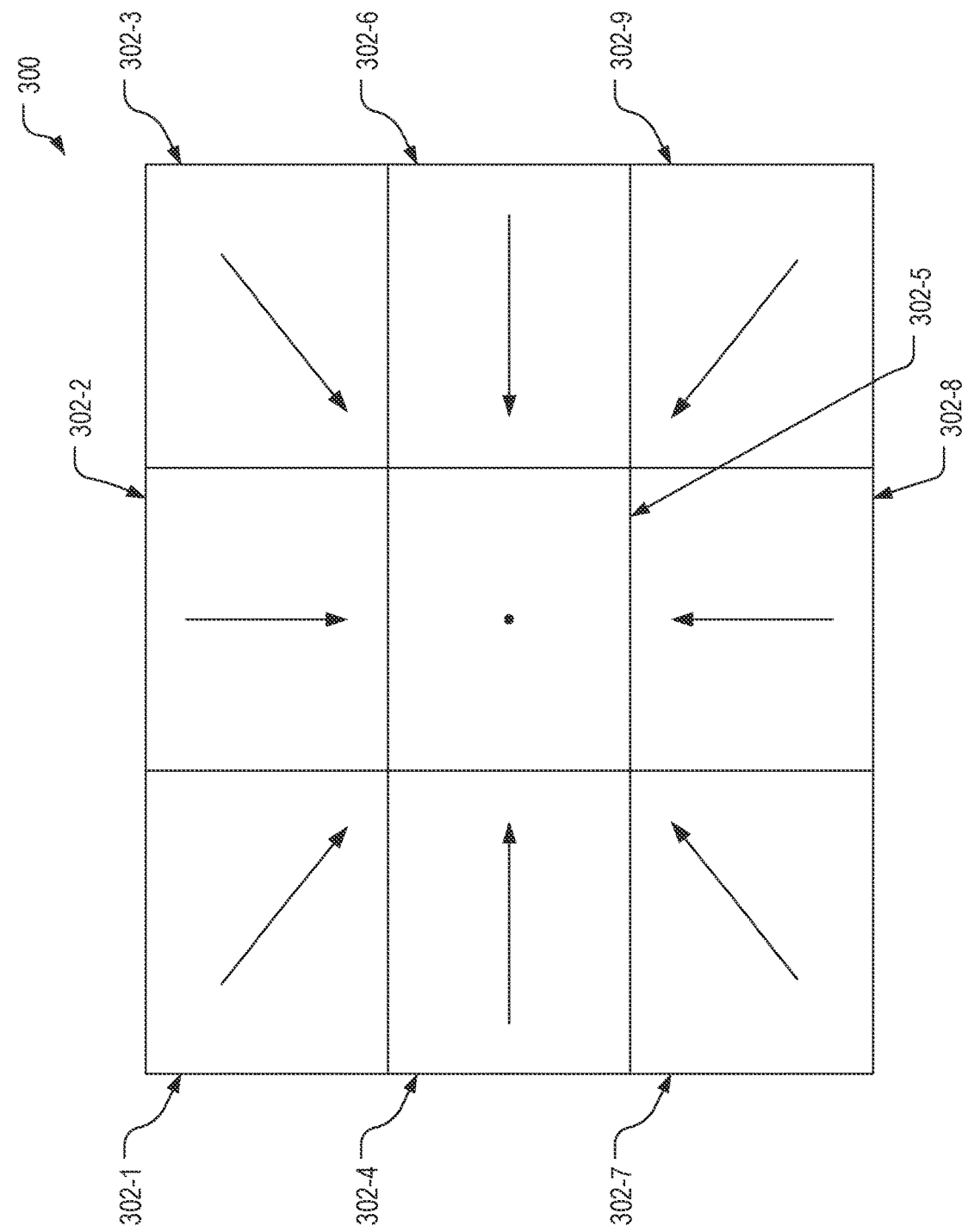
FIG. 5A represents how the segments of the privacy cell can be individually controlled to direct light in a different direction.

FIG. 5A represents one example of how the nine segments of privacy cell 300 can be individually controlled in one use case. In FIG. 5A, the arrows are intended to represent the general direction in which the liquid crystal molecules within each segment are aligned and therefore represent the general direction in which light must be traveling to pass through the segment. The middle segment—the segment corresponding to electrode 302-5—can be configured to cause the liquid crystal molecules to be perpendicular to the plane of privacy cell 300 such that light that passes into this segment perpendicular to the plane will pass through. In contrast, the surrounding segments—the segments corresponding to electrodes 302-1 through 302-4 and 302-6 through 302-9—can be configured to cause the liquid crystal molecules to be angled inwardly towards the center point of privacy cell 300. Although not adequately represented by the 2-dimensional FIG. 5A, this inward orientation would be towards the location where the user would typically be (i.e., out from the figure in FIG. 5A). Stated another way, each segment could be controlled so that light that is traveling towards where the user would be will be allowed to pass through while light traveling in other directions (e.g., light traveling in an outward direction) will be blocked.

In comparison to existing privacy cells which orient all liquid crystal molecules in the same direction regardless of their location within the privacy cell, privacy cell 300 enables a much improved privacy mode to be implemented. For example, when all the liquid crystal molecules are oriented in the same direction (e.g., perpendicular to the plane of the privacy cell), the visibility of the edges of the display may be diminished even when the user is sitting directly in front of the display device. In contrast, by providing segmented control to enable all the liquid crystal molecules to be oriented towards the user, privacy cell 300 can ensure that the visibility of the edges of the display are similar to the visibility of the center of the display.

Figure 1:
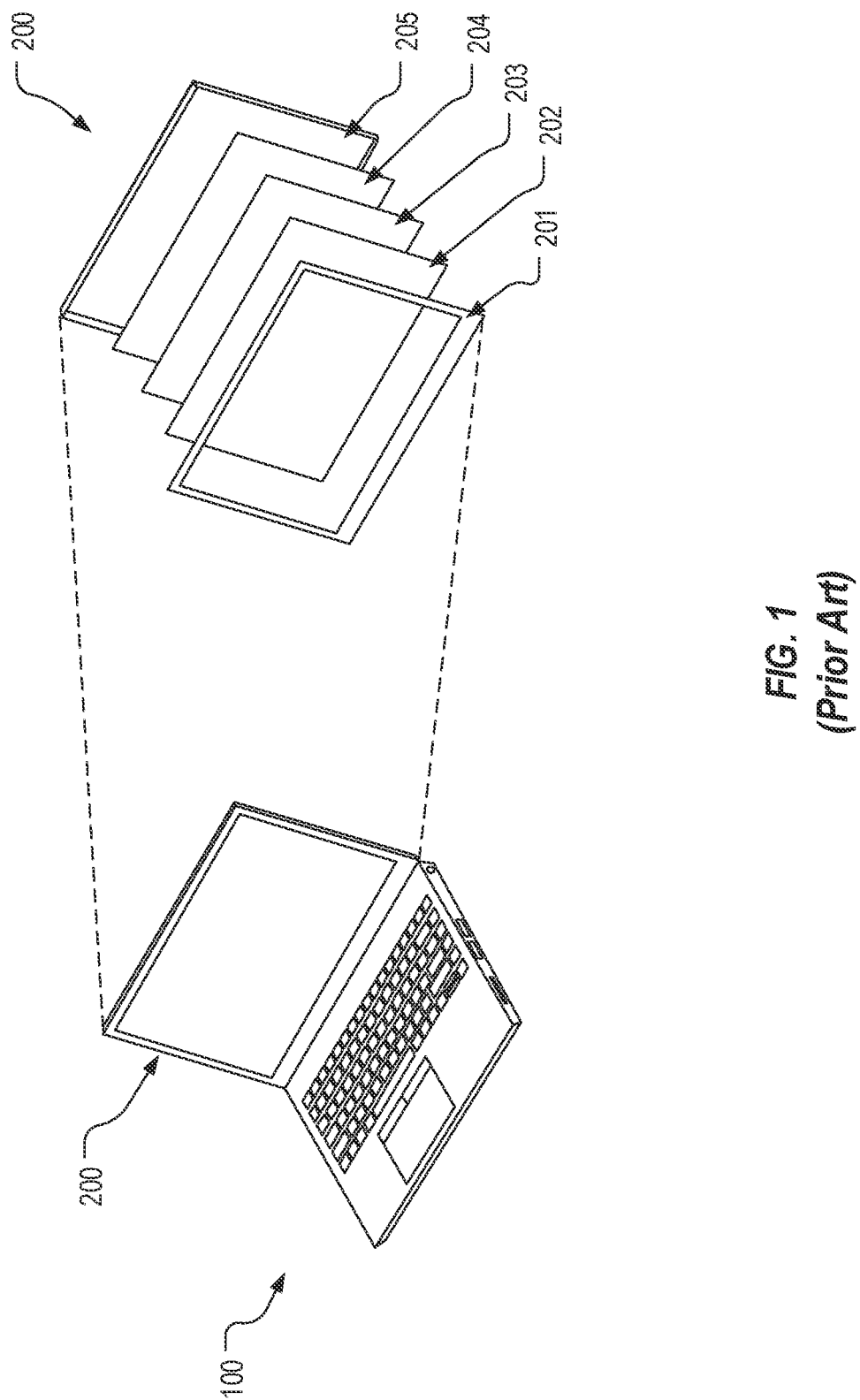
FIG. 1 illustrates an example of a computing device that includes a display device with a privacy cell.
Figure 2:
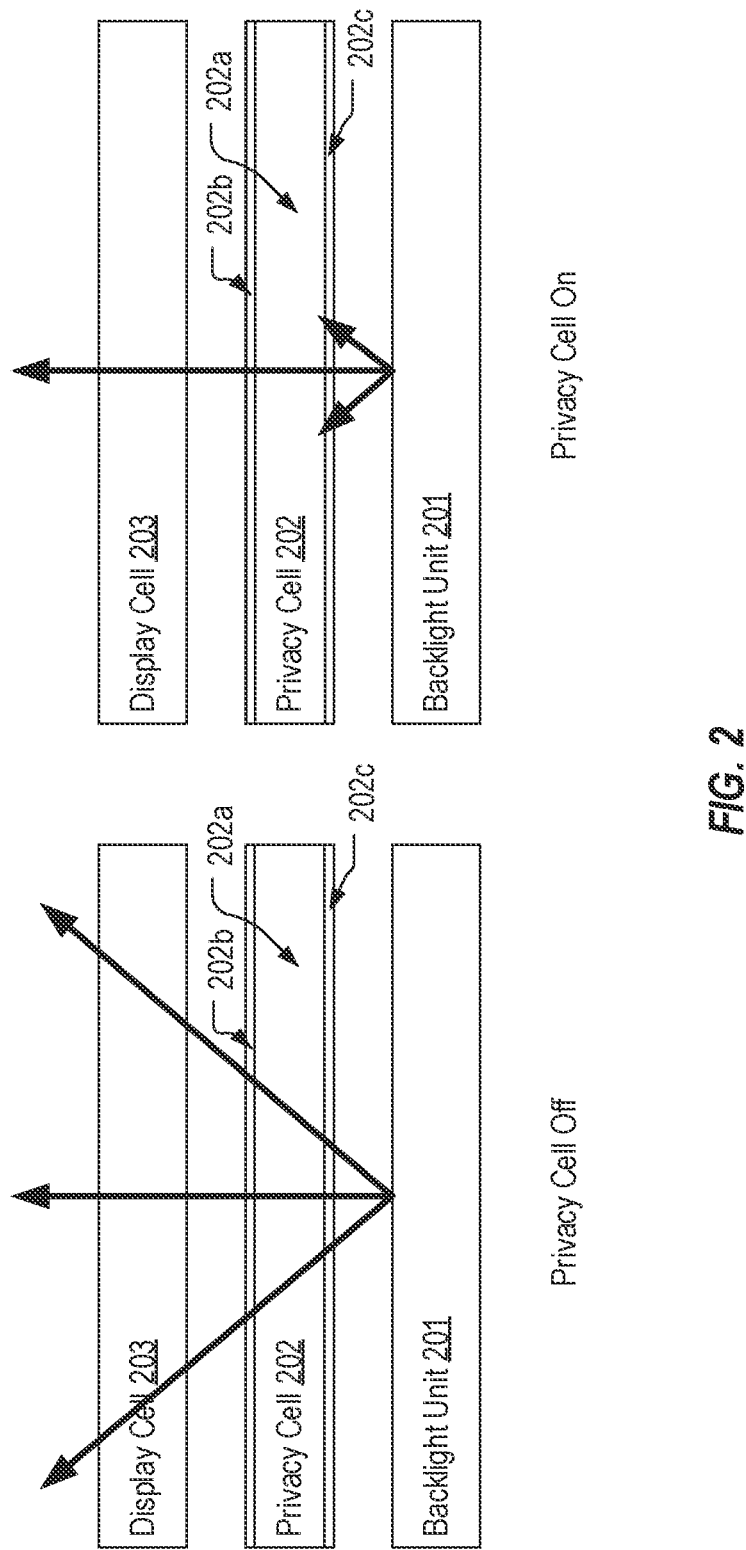
FIG. 2 provides an example of how a privacy cell can selectively provide privacy.
Figure 5B:
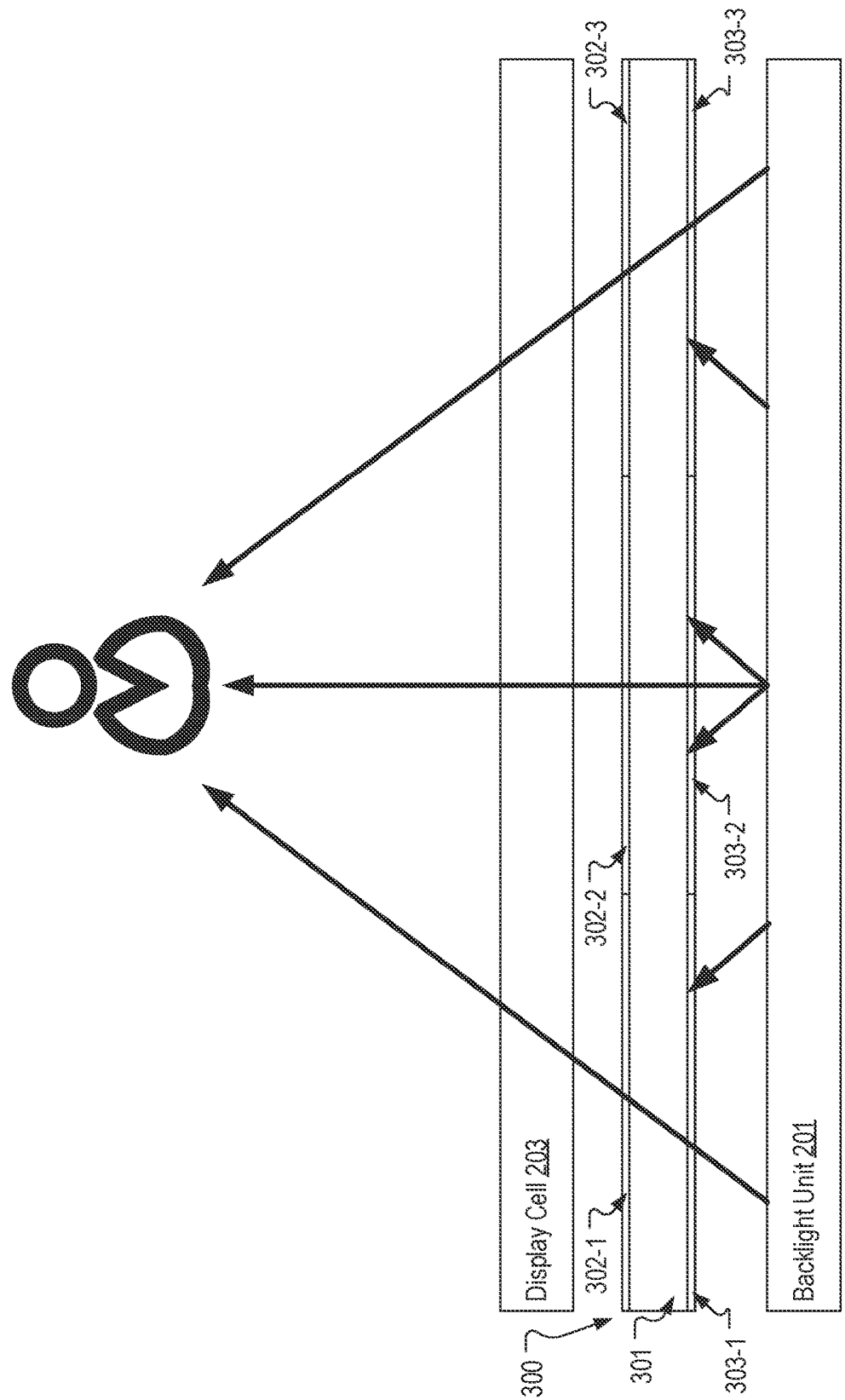
FIG. 5B represents how the individually controllable segments of the privacy cell can be configured in a privacy mode to allow light directed towards the user to pass through while blocking light that is not directed towards the user.

FIG. 5B provides an example of how the segmented control of privacy cell 300 can provide an enhanced privacy mode. FIG. 5B represents a top view of display device 200 similar to FIG. 2 but with privacy cell 300 being used in place of privacy cell 202. In FIG. 5B, it is assumed that the user has turned on privacy mode. In response, components that controls privacy cell 300 can apply a distinct voltage between each electrode pair to cause the liquid crystal molecules between each electrode pair to be oriented towards the user. In the depicted example, the voltages applied between electrodes 302-1 and 303-1 and between electrodes 302-3 and 303-3 could be selected to cause the liquid crystal molecules in these segments to be oriented inwardly and downwardly so that light traveling from backlight unit 201 towards the user will pass through these segment while light that is not traveling towards the user will be blocked. Similarly, the voltage applied between electrodes 302-2 and 303-2 could be selected to cause the liquid crystal molecules in that segment to be oriented downwardly so that light traveling from backlight unit 201 towards the user will pass through the segment while light that is not traveling towards the user will be blocked.

Figure 6:
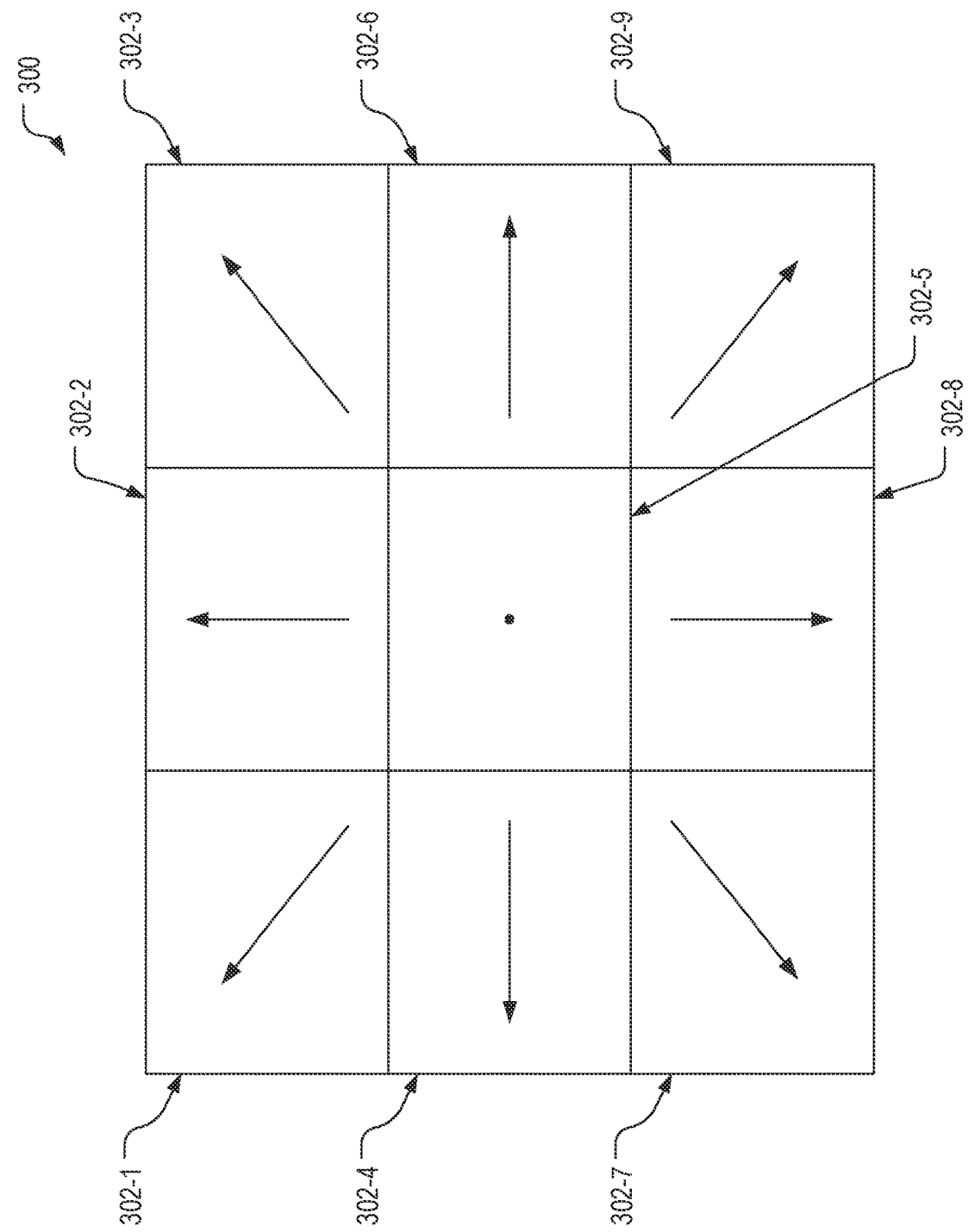
FIG. 6 represents how the individually controllable segments of the privacy cell can be configured to enhance a share mode.

FIG. 6 provides an example of how the segmented control of privacy cell 300 can enhance a sharing mode. In FIG. 6, the arrows in the outer segments are opposite those of FIG. 5A. Accordingly, FIG. 6 represents a use case where the voltages applied to the electrodes of the outer segments are selected to orient the liquid crystal molecules in the outer segments away from the user. This can enhance the visibility of the display to individuals that are viewing the display at an angle without overly diminishing the visibility of the display to the user seated in front of the display.

The segmented control of privacy cell 300 can also be leveraged for other use cases or customizations. For example, it may be desirable to provide privacy only to a portion of the display. This could be accomplished by applying a suitable voltage to the segments corresponding to the portion that should be kept private (e.g., the bottom-right corner of the display or the left half of the display). In some embodiments, the user may be able to select which portion of the display should be kept private. In such cases, the activation of privacy mode may only activate (e.g., apply the distinct voltage to) the segments of privacy cell 300 that the user has specified.

In some embodiments, a computing device may include components (e.g., circuitry and/or software) for detecting the presence of the user and particularly the user's location relative to the display device. In such cases, the components can calculate and apply voltages to each segment of privacy cell 300 to cause the liquid crystal molecules in each segment to be oriented towards the actual location of the user (as opposed to a default/pre-configured location). In such embodiments, the components may also dynamically update the voltages applied to each segment based on the user's movement to thereby cause the orientation of the liquid crystal molecules to track the user's location. For example, while privacy mode is on, if the user leans towards the left side of the display, the components may detect this movement and adjust the voltages applied to each segment to cause the liquid crystal molecules to be reoriented towards the left. Similar adjustments could be made in sharing mode based on the detected location of one or more viewers near the user.

Figure 7:
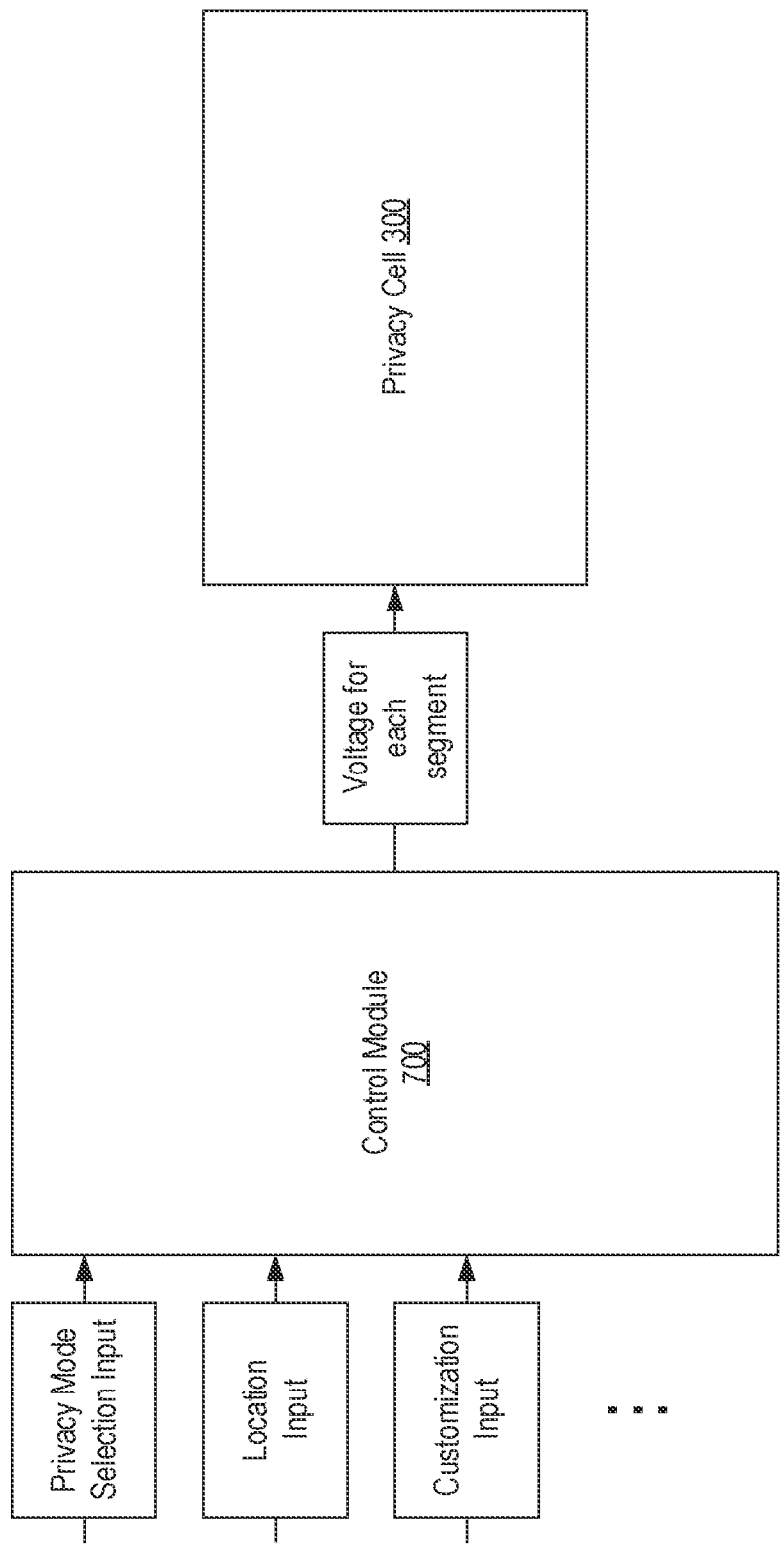
FIG. 7 illustrates a block diagram of components that may be employed on a computing device that includes or controls a privacy cell.

FIG. 7 provides a block diagram of components that may be employed within a computing device that includes or controls privacy cell 300. Control module 700 can represent any suitable combination of hardware/software for applying voltages to each segment of privacy cell 300. As shown, control module 700 may be configured to leverage a number of different inputs to determine which voltages to apply. In some embodiments, control module 700 may determine which voltages to apply to each segment based only on input that selects privacy mode. For example, control module 700 could be configured to toggle between two sets of voltages based on whether the user has turned privacy mode on or off.

In some embodiments, control module 700 may determine which voltages to apply to each segment based on a location input. For example, a camera or other sensor could detect the location of a user or a viewer relative to the display device and could provide location input indicative of this location. Control module 700 could then select voltages that cause the liquid crystal molecules in one or more segments to be oriented towards this location.

In some embodiments, control module 700 may determine which voltages to apply to each segment based on customization input. For example, a user could provide input identifying a subset of segments that should be activated in privacy mode. As another example, a user could provide input identifying adjustments to be made to current or default voltages that control module 700 is using for one or more segments such as to tune the orientation of the liquid crystal molecules in a segment.

In summary, a privacy cell can be segmented to allow the liquid crystal within each segment to be independently controlled. In this way, each segment can be used to direct light in a direction that optimizes the current mode of operation.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A privacy cell for a display device comprising:
a liquid crystal portion having a first side and a second side;
a segmented array of electrodes arranged on the first side to thereby divide the liquid crystal into a plurality of segments, wherein the plurality of segments include a middle segment and a plurality of outer segments around the middle segment;

one or more electrodes arranged on the second side to which the segmented array of electrodes are connected; and circuitry that is configured to selectively apply a first set of distinct voltages and a second set of distinct voltages each electrode in the segmented array of electrodes to thereby independently control the liquid crystal within each of the plurality of segments to cause the liquid crystal within each of the plurality of segments to be oriented at a distinct angle that is based on a position of the respective segment within the segmented array, wherein, when the first set of distinct voltages are applied, each distinct angle is oriented towards a user that is positioned in front of the display device, whereas, when the second set of distinct voltages are applied, the distinct angle of the plurality of outer segments is oriented away from the user that is positioned in front of the display device while the distinct angle of the middle segment is oriented towards the user that is positioned in front of the display.

2. The privacy cell of claim 1, wherein the one or more electrodes on the second side comprise a second segmented array of electrodes.

3. The privacy cell of claim 1, wherein the circuitry is configured to receive privacy mode selection input and to select the first set of distinct voltages or the second set of distinct voltages in response to the privacy mode selection input.

4. The privacy cell of claim 1, wherein the circuitry is configured to receive location input and to calculate the first set of distinct voltages and the second set of distinct voltages based on the location input.

5. The privacy cell of claim 1, wherein the circuitry is configured to receive customization input from the user and to calculate one or both of the first set of distinct voltages and the second set of distinct voltages based on the customization input.

6. The privacy cell of claim 5, wherein calculating one or both of the first set of distinct voltages and the second set of distinct voltages based on the customization input comprises foregoing applying the distinct voltage to one or more of the electrodes in the segmented array of electrodes.

7. The privacy cell of claim 5, wherein calculating one or both of the first set of distinct voltages and the second set of distinct voltages based on the customization input comprises tuning the distinct voltage applied to one or more of the electrodes in the segmented array of electrodes.

8. The privacy cell of claim 1, wherein the circuitry is configured to receive privacy mode selection input and to select the first set of distinct voltages or the second set of distinct voltages in response to the privacy mode selection input;

wherein the circuitry is configured to receive location input of the user and to calculate the first set of distinct voltages and the second set of distinct voltages based on the location input; and wherein the circuitry is configured to receive customization input from the user and to calculate the first set of distinct voltages and the second set of distinct voltages based on the location input.

9. A display device comprising:
a backlight unit;
a display cell; and
a privacy cell positioned between the backlight unit and the display cell, the privacy cell comprising:
a liquid crystal portion having a first side and a second side;
a segmented array of electrodes arranged on the first side to thereby divide the liquid crystal into a plurality of segments, wherein the segmented array of electrodes includes a middle segment and a plurality of outer segments around the middle segment;
one or more electrodes arranged on the second side to which the segmented array of electrodes are connected; and
circuitry for independently applying either a first set of distinct voltages or a second set of distinct voltages to each electrode in the segmented array of electrodes to thereby independently control the liquid crystal within each of the plurality of segments to cause the liquid crystal within each of the plurality of segments to be oriented at a distinct angle that is based on a position of the respective segment within the segmented array, wherein, when the first set of distinct voltages are applied, each distinct angle is oriented towards a user that is positioned in front of the display device, whereas, when the second set of distinct voltages are applied, the distinct angle of the plurality of outer segments is oriented away from the user that is positioned in front of the display device while the distinct angle of the middle segment is oriented towards the user that is positioned in front of the display.

10. The display device of claim 9, wherein the circuitry is configured to receive privacy mode selection input and to select the first set of distinct voltages or the second set of distinct voltages in response to the privacy mode selection input.

11. The display device of claim 9, wherein the circuitry is configured to receive location input and to calculate the first set of distinct voltages and the second set of distinct voltages based on the location input.

12. The display device of claim 9, wherein the circuitry is configured to receive customization input from the user and to calculate one or both of the first set of distinct voltages and the second set of distinct voltages based on the customization input.

13. The display device of claim 12, wherein calculating one or both of the first set of distinct voltages and the second set of distinct voltages based on the customization input comprises foregoing applying the distinct voltage to one or more of the electrodes in the segmented array of electrodes.

14. The display device of claim 12, wherein calculating one or both of the first set of distinct voltages and the second set of distinct voltages based on the customization input comprises tuning the distinct voltage applied to one or more of the electrodes in the segmented array of electrodes.

15. The display device of claim 9, wherein the circuitry is configured to receive privacy mode selection input and to select the first set of distinct voltages or the second set of distinct voltages in response to the privacy mode selection input;

wherein the circuitry is configured to receive location input of the user and to calculate the first set of distinct voltages and the second set of distinct voltages based on the location input; and wherein the circuitry is configured to receive customization input from the user and to calculate the first set of distinct voltages and the second set of distinct voltages based on the location input.

16. A method for controlling a segmented privacy cell of a display device comprising:
- detecting input requesting that privacy mode be implemented on the display device;
- obtaining, for a plurality of segments of the segmented privacy cell including a middle segment and a plurality of outer segments around the middle segment, a first set of distinct voltages that are based on positions of the respective segments within the segmented privacy cell;
- applying the first set of distinct voltages to the plurality of segments of the segmented privacy cell to thereby cause each of the plurality of segments to be independently controlled to cause liquid crystal within each of the plurality of segments to be oriented at a distinct angle that is based on the position of the respective segment within the segmented privacy cell, wherein, when the first set of distinct voltages are applied, each distinct angle is oriented towards a user that is positioned in front of the display device;
- detecting input requesting that privacy mode not be implemented on the display device;
- obtaining, for the plurality of segments of the segmented privacy cell, a second set of distinct voltages that are based on positions of the respective segments within the segmented privacy cell; and
- applying the second set of distinct voltages to the plurality of segments of the segmented privacy cell to thereby cause each of the plurality of segments to be independently controlled to cause liquid crystal within each of the plurality of segments to be oriented at a distinct angle that is based on the position of the respective segment within the segmented privacy cell, wherein when the second set of distinct voltages are applied, the distinct angle of the plurality of outer segments is oriented away from the user that is positioned in front of the display device while the distinct angle of the middle segment is oriented towards the user that is positioned in front of the display.

17. The method of claim 16, wherein each of the plurality of segments comprises an electrode, and wherein applying the distinct voltages to the plurality of segments comprises applying the voltages to the electrodes.

18. The method of claim 16, wherein the input identifies a location of a user relative to the display device; and
- wherein obtaining, for each of the plurality of segments of the segmented privacy cell, the distinct voltage comprises calculating, for each of the plurality of segments, the distinct voltage based on the identified location.

* * * * *